United States Patent
Anastasopoulos et al.

(10) Patent No.: US 9,190,671 B2
(45) Date of Patent: Nov. 17, 2015

(54) BISMUTH PALLADIUM BASED CATALYST FOR A FUEL CELL WITH A MOLECULAR HYDROGEN SOURCE

(75) Inventors: Alexandros Anastasopoulos, Southampton (GB); Brian Elliott Hayden, Highfield (GB)

(73) Assignee: University of Southampton, Southampton (GB)

(*) Notice: Subject to any disclaimer, the term of this patent is extended or adjusted under 35 U.S.C. 154(b) by 37 days.

(21) Appl. No.: 13/637,201

(22) PCT Filed: Mar. 21, 2011

(86) PCT No.: PCT/GB2011/050556
§ 371 (c)(1),
(2), (4) Date: Dec. 24, 2012

(87) PCT Pub. No.: WO2011/117615
PCT Pub. Date: Sep. 29, 2011

(65) Prior Publication Data
US 2013/0101911 A1 Apr. 25, 2013

(30) Foreign Application Priority Data
Mar. 26, 2010 (GB) .................................. 1005092.0

(51) Int. Cl.
*H01M 4/92* (2006.01)
*H01M 4/86* (2006.01)
(Continued)

(52) U.S. Cl.
CPC ............... *H01M 4/921* (2013.01); *C25B 1/02* (2013.01); *C25B 1/04* (2013.01); *H01M 4/86* (2013.01);
(Continued)

(58) Field of Classification Search
CPC ............ H01M 4/921; H01M 8/04201; H01M 8/1004; H01M 4/86; H01M 4/8867; H01M 8/1002; H01M 8/0656; H01M 2008/1095; C25B 1/02; C25B 1/04; Y02E 60/366; Y02E 60/521

USPC .................. 429/422, 487, 513, 525
See application file for complete search history.

(56) References Cited

U.S. PATENT DOCUMENTS

| 4,843,173 A | 6/1989 | Saito et al. |
| 6,391,486 B1 * | 5/2002 | Narayanan et al. ........... 429/535 |
| 2007/0167318 A1 | 7/2007 | Walsdorff |

FOREIGN PATENT DOCUMENTS

| BE | 883331 A | 9/1990 |
| GB | 1 559 700 | 1/1980 |

(Continued)

OTHER PUBLICATIONS

Brian E. Hayden, The promotion of CO electro-oxidation on platinum-bismuth as a model for surface mediated oxygen transfer, Catalysis Today, vol. 38, Issue 4, Nov. 29, 1997, pp. 473-481, ISSN 0920-5861.*

(Continued)

*Primary Examiner* — Milton I Cano
*Assistant Examiner* — Philip A Stuckey
(74) *Attorney, Agent, or Firm* — Renner, Otto, Boisselle & Sklar, LLP

(57) ABSTRACT

A hydrogen fuel cell comprising: an anode; a cathode; an electrolyte; a source of a hydrogen-containing fuel for the fuel cell; and a source of an oxidant for the fuel cell; wherein the anode and, optionally, the cathode includes a catalyst comprising an alloy of the formula (I):

$$Pd_xBi_yM_z \qquad (I)$$

wherein: M is one or more metals; x is 0.2 to 0.4; y is 0.6 to 0.8; z is not greater than 0.1; and x+y+z=1; is described. Catalysts and electrodes for hydrogen fuel cells comprising the alloy and electrochemical methods using the alloy catalysts are also described.

14 Claims, 6 Drawing Sheets

(51) Int. Cl.
| | |
|---|---|
| H01M 8/10 | (2006.01) |
| C25B 1/02 | (2006.01) |
| C25B 1/04 | (2006.01) |
| H01M 8/04 | (2006.01) |
| H01M 8/06 | (2006.01) |
| H01M 4/88 | (2006.01) |

(52) U.S. Cl.
CPC ........ *H01M 8/04201* (2013.01); *H01M 8/0656* (2013.01); *H01M 8/1002* (2013.01); *H01M 8/1004* (2013.01); *H01M 4/8867* (2013.01); *H01M 2008/1095* (2013.01); *Y02E 60/366* (2013.01); *Y02E 60/521* (2013.01)

(56) References Cited

FOREIGN PATENT DOCUMENTS

| | | | |
|---|---|---|---|
| WO | 2004/012290 | | 2/2004 |
| WO | 2007/042841 A1 | | 4/2007 |
| WO | 2008/080227 | | 7/2008 |
| WO | WO 2008080227 A1 * | 7/2008 | ............ H01M 4/92 |
| WO | 2009/082666 A1 | | 7/2009 |

OTHER PUBLICATIONS

F Alardin, P Ruiz, B Delmon, M Devillers, Bismuth-promoted palladium catalysts for the selective oxidation of glyoxal into glyoxalic acid, Applied Catalysis A: General, vol. 215, Issues 1-2, Jul. 13, 2001, pp. 125-136.*

Innocenzo G. Casella, Michela Contursi, Characterization of bismuth adatom-modified palladium electrodes: the electrocatalytic oxidation of aliphatic aldehydes in alkaline solutions, Electrochemicia Acta, vol. 52, Issue 2, Oct. 25, 2006, pp. 649-657.*

Xingwen Yu and Peter Pickup, PdBi /C and PtPb/C Bimetallic Catalysts for Direct Formic Acid Fuel Cells, International Journal of Green Energy, vol. 6, 571-582, 2009.*

International Search Report for corresponding patent application No. PCT/GB2011/050556 dated Jul. 13, 2011.

Xi Ngwen Yua & Peter G Pi Ckupa: "PdBi /C and PtPb/C Bimetallic Catalysts for Direct Formic Acid Fuel Cells", International Journal of Green Energy, Taylor & Francis Inc. US., vol. 6. No. 6, Jan. 2009, pp. 571-582.

Demarconnay et al: "Ethylene glycol electrooxidation in alkaline medium at multi-metallic Pt based catalysts", Journal of Electroanalytical Chemistry and Interfacialelectro Chemistry. Elsevier. Amsterdam. NL, vol. 601. No. 1-2, Mar. 2007, pp. 169-180.

Okamoto H, "The Bi-Pd (Bismuth-Palladium) System", Journal of Phase Equilibria, vol. 15, No. 2, 1994, pp. 191-194.

Guerin, S., et al "Combinatorial Electrochemical Screening of Fuel Cell Electrocatalysts", J. Comb. Chem. 2004, 6, (1), pp. 149-158.

Guerin et al, Physical Vapor Deposition Method for the High-Throughput Synthesis of Solid-State Material Libraries, J. Comb. Chem, 2006, 8, pp. 66-73.

Guerin, S. et al "High-Throughput Synthesis and Screening of Ternary Metal Alloys for Electrocatalysis", J. Phys. Chem. B 2006, 110, (29), pp. 14355-14362.

Greeley et al., "Computational High-Throughput Screening of Electrocatalytic Materials for Hydrogen Evolution" Nature Materials, 2006, vol. 5, 909-913.

Duan, X. et al., "Structure and Electrical Properties of Bismuth Thin Films Prepared by Flash Evaporation Method", State Key Lab for Materials Processing and Dies & Mold Technology, Elsevier B.V., Material Letters 61 (2007), pp. 4341-4343.

Chu, S. Z. et al, "Fabrication and Characteristics of Pd Nanoparticles/Nanofilms on Ceramics Toward Catalytic Electrodes", Materials Schience Lab, Central Research Institute of Electric Power Industry (CRIEPI), Elsevier Ltd., Electrochim. Acta (2007) pp. 92-99.

Egelhoff, W.F., Jr. "Surf. Sci. Rep." 1986, 6, (6-8), pp. 253-415. (File separated into multiple parts for submission due to size of document.).

Suo, Yange et al. "Size-controlled synthesis and impedance-based mechanistic understanding of Pd/C nanoparticles for formic acid oxidation", Electrochimica Acta 55, pp. 210-217 (2009).

* cited by examiner

BISMUTH PALLADIUM BASED CATALYST FOR A FUEL CELL WITH A MOLECULAR HYDROGEN SOURCE

This application is a national phase of International Application No. PCT/GB2011/050556 filed Mar. 21, 2011 and published in the English language which also claims foreign priority under 35 U.S.C. 119 to the United Kingdom application number 1005092.0 filed on Mar. 26, 2010.

FIELD OF THE INVENTION

This invention relates to an alloy for use as a catalyst in hydrogen fuel cells. The invention also relates to a hydrogen fuel cell having one or more electrodes including the alloy and its use to catalyse a number of reactions, particularly in electrochemical and fuel cells.

BACKGROUND TO THE INVENTION

A fuel cell is an electrochemical cell that converts a source fuel into an electrical current and water. It generates electricity inside a cell through reactions between a fuel and an oxidant, triggered in the presence of an electrolyte. The reactants flow into the cell, and the reaction products flow out of it, while the electrolyte remains within it. Fuel cells can operate virtually continuously as long as the necessary flows are maintained.

A fuel cell comprises a fuel electrode (anode), an oxidizer electrode (cathode), an electrolyte interposed between the electrodes and means for separately supplying a stream of fuel and a stream of oxidizer to the anode and the cathode, respectively. In operation, fuel supplied to the anode is oxidized releasing electrons which are conducted via an external circuit to the cathode. At the cathode the supplied electrons are consumed when the oxidizer is reduced. Proton exchange membrane fuel cells use a solid proton-conducting polymer membrane as the electrolyte.

Applications for fuel cells include battery replacement; charging of mini- and microelectronics such as portable electronic devices; sensors such as gas detectors, seismic sensors, and infrared sensors; electromechanical devices; automotive engines and other transportation power generators; power plants, and many others.

Electrochemical fuel cells can employ a variety of gaseous fuels and oxidants. For example, hydrogen fuel cells employ molecular hydrogen as the fuel and oxygen in air or a carrier gas as the oxidant. In hydrogen fuel cells, hydrogen gas is oxidised and oxygen gas reduced to form water, with an electrical current produced as a by-product of the redox reaction. Electron flow along the electrical connection between the anode and the cathode provides electrical power to load(s) interposed in the circuit with the electrical connection between the anode and the cathode. The anode and cathode reactions in hydrogen/oxygen fuel cells are shown in the following equations:

Anode reaction: $H_2 \rightarrow 2H^+ + 2e^-$

Cathode reaction: $\frac{1}{2}O_2 + 2H^+ + 2e^- \rightarrow H_2O$

Hydrogen fuel cells usually employ a catalyst at the electrodes, especially the anode, to increase the rate of the redox reaction. Such catalysts typically comprise noble metals such as ruthenium, rhodium, palladium, silver, osmium, iridium, platinum or gold. However, these metals are scarce and therefore expensive.

In particular, palladium is commonly used in catalysts for redox reactions involving hydrogen. However, palladium is known to absorb electrolytically produced hydrogen to form a hydride: the hydride forms a rapidly disintegrating powder which makes it unsuitable for catalysis.

It would therefore be desirable to produce a material suitable for catalysing the redox reactions taking place in a hydrogen fuel but is cheaper than the materials currently used.

Greeley et al., *Nature Materials*, 2006, 5, 909-913, describes a computational high-throughput screening method of electrocatalytic materials for hydrogen evolution, and describes in detail a platinum/bismuth alloy and its catalytic activity in hydrogen evolution.

WO 2008/080227 describes a number of different catalysts, especially platinum/tin and palladium/bismuth catalysts, and their use in a number of electrochemical oxidation of organic compounds, in particular formic acid.

U.S. Pat. No. 4,843,173 describes palladium-bismuth/carbon catalysts and their use in oxidising glucose to gluconic acid.

BE 883331 describes palladium-bismuth intermetallic compounds, including $PdBi_2$. The compounds are stated to be useful as catalysts for converting aldehydes and alcohols into carboxylic esters.

U.S. 2007/0167318 describes catalytically active compositions comprising Pd, Bi and at least one other element. The compositions are stated to be useful in dehydrogenating hydrocarbons.

WO 2004/012290 describes intermetallic compounds for use as catalysts and catalyst systems. The intermetallic compounds are stated to be useful for catalysing reactions in fuel cells.

GB 1559700 describes electrochemical cells capable of catalysing the conversion of a hydrocarbon containing at least one hydroxyl group, in which at least one electrode comprises a composition comprising bismuth and one or both of platinum and palladium.

SUMMARY OF THE INVENTION

It is an object of this invention to provide alloys which are effective catalysts for a number of electrochemical reactions, in particular the hydrogen evolution reaction (HER) and the hydrogen oxidation reaction (HOR) and therefore suitable as catalysts for hydrogen fuel cells, but which are less costly than currently used platinum-based alloys.

It has surprisingly been found according to the present invention that the addition of bismuth to palladium results in an alloy material capable of effective catalysis of the electrochemical reactions taking place in hydrogen fuel cells but much is cheaper to manufacture and resistant to hydride formation. This is contrary to what would have been expected as bismuth alone does not catalyse the HOR or HER reactions.

In one aspect, the invention provides a hydrogen fuel cell comprising: an anode; a cathode; an electrolyte; means for electrically insulating the anode from the cathode; means for supplying a hydrogen-containing fuel to the fuel cell; and means for supplying an oxidant to the fuel cell; wherein the anode and, optionally, the cathode includes a catalyst comprising an alloy of the formula (I):

$$Pd_xBi_yM_z \quad (I)$$

wherein:
M is a metal;
x is 0.1 to 0.7;
y is 0.3 to 0.9;
z is not greater than 0.1; and
x+y+z=1.

In another aspect, the invention provides a hydrogen fuel cell comprising:
an anode;
a cathode;
an electrolyte; and
means for supplying a hydrogen-containing fuel to the fuel cell; and
means for supplying an oxidant to the fuel cell;
wherein the anode and, optionally, the cathode includes a catalyst comprising an alloy of the formula (I):

$$Pd_xBi_yM_z \qquad (I)$$

wherein:
M is one or more metals;
x is 0.2 to 0.4;
y is 0.6 to 0.8;
z is not greater than 0.1; and
x+y+z=1.

In another aspect, the invention provides a catalyst for a hydrogen fuel cell, the catalyst comprising an alloy of the formula (I'):

$$Pd_{x'}Bi_{y'}M_{z'} \qquad (I')$$

wherein:
M is a metal;
x' is 0.2 to 0.45;
y' is 0.55 to 0.8;
z' is not greater than 0.1; and
x'+y'+z'=1;
supported on a support means not including Bi or Pd.

In an additional aspect, the invention provides use of an alloy of the formula (I'):

$$Pd_{x'}Bi_{y'}M_{z'} \qquad (I')$$

wherein:
M is a metal;
x' is 0.2 to 0.45;
y' is 0.55 to 0.8;
z' is not greater than 0.1; and
x'+y'+z'=1;
as a catalyst, particularly although not exclusively for a hydrogen fuel cell.

In a further aspect, the invention provides an electrode comprising a catalyst as defined above, and optionally a further support means.

In a still further aspect, the invention provides a membrane-electrode assembly for a hydrogen fuel cell comprising a proton-conducting membrane, an anode and a cathode, the anode comprising an electrode as defined above.

In a yet further aspect, the invention provides a membrane-electrode assembly for a hydrogen fuel cell comprising a proton-conducting membrane, an anode and a cathode, wherein the anode and, optionally, the cathode includes a catalyst comprising an alloy of the formula (I):

$$Pd_xBi_yM_z \qquad (I)$$

wherein:
M is one or more metals;
x is 0.2 to 0.4;
y is 0.6 to 0.8;
z is not greater than 0.1; and
x+y+z=1.

In a yet further aspect, the invention provides a method of producing hydrogen gas, comprising reducing a proton source at the cathode of an electrochemical cell, the cathode comprising an electrode as defined above or comprising a catalyst as defined above.

In a still further aspect, the invention provides a method of producing hydrogen gas, comprising reducing a proton source using an electrochemical cell having an anode, a cathode and an electrolyte; wherein the cathode and, optionally, the anode includes a catalyst comprising an alloy of the formula (I):

$$Pd_xBi_yM_z \qquad (I)$$

wherein:
M is one or more metals;
x is 0.2 to 0.4;
y is 0.6 to 0.8;
z is not greater than 0.1; and
x+y+z=1.

In a still further aspect, the invention provides a method of electrolysing water, the water being optionally ionised and/or acidified, the method comprising causing electric current to flow through a cell, the anode and, optionally, the cathode of the cell comprising an electrode as defined above or comprising a catalyst as defined above.

In a yet further aspect, the invention provides a method of electrolysing water, the water being optionally ionised and/or acidified, the method comprising causing electric current to flow through a cell, the cell having an anode, a cathode and an electrolyte, wherein the anode and, optionally, the cathode includes a catalyst comprising an alloy of the formula (I):

$$Pd_xBi_yM_z \qquad (I)$$

wherein:
M is one or more metals;
x is 0.2 to 0.4;
y is 0.6 to 0.8;
z is not greater than 0.1; and
x+y+z=1.

In a yet further aspect, the invention provides a method of oxidising a hydrogen-containing gas, the method comprising contacting the hydrogen-containing gas with the anode of an electrochemical cell, the anode comprising an electrode as defined above or comprising a catalyst as defined above.

In a yet further aspect, the invention provides a method of oxidising a hydrogen-containing gas, the method comprising contacting the hydrogen-containing gas with the anode of an electrochemical cell, the cell having an anode, a cathode and an electrolyte, wherein the anode and, optionally, the cathode includes a catalyst comprising an alloy of the formula (I):

$$Pd_xBi_yM_z \qquad (I)$$

wherein:
M is one or more metals;
x is 0.2 to 0.4;
y is 0.6 to 0.8;
z is not greater than 0.1; and
x+y+z=1.

In a still further aspect, the invention provides a method of generating an electric current, comprising supplying a hydrogen-containing gas to the hydrogen fuel cell as defined above and causing the hydrogen-containing gas to be oxidised at the anode of the hydrogen fuel cell.

DETAILED DESCRIPTION

Catalyst

Figure 1:
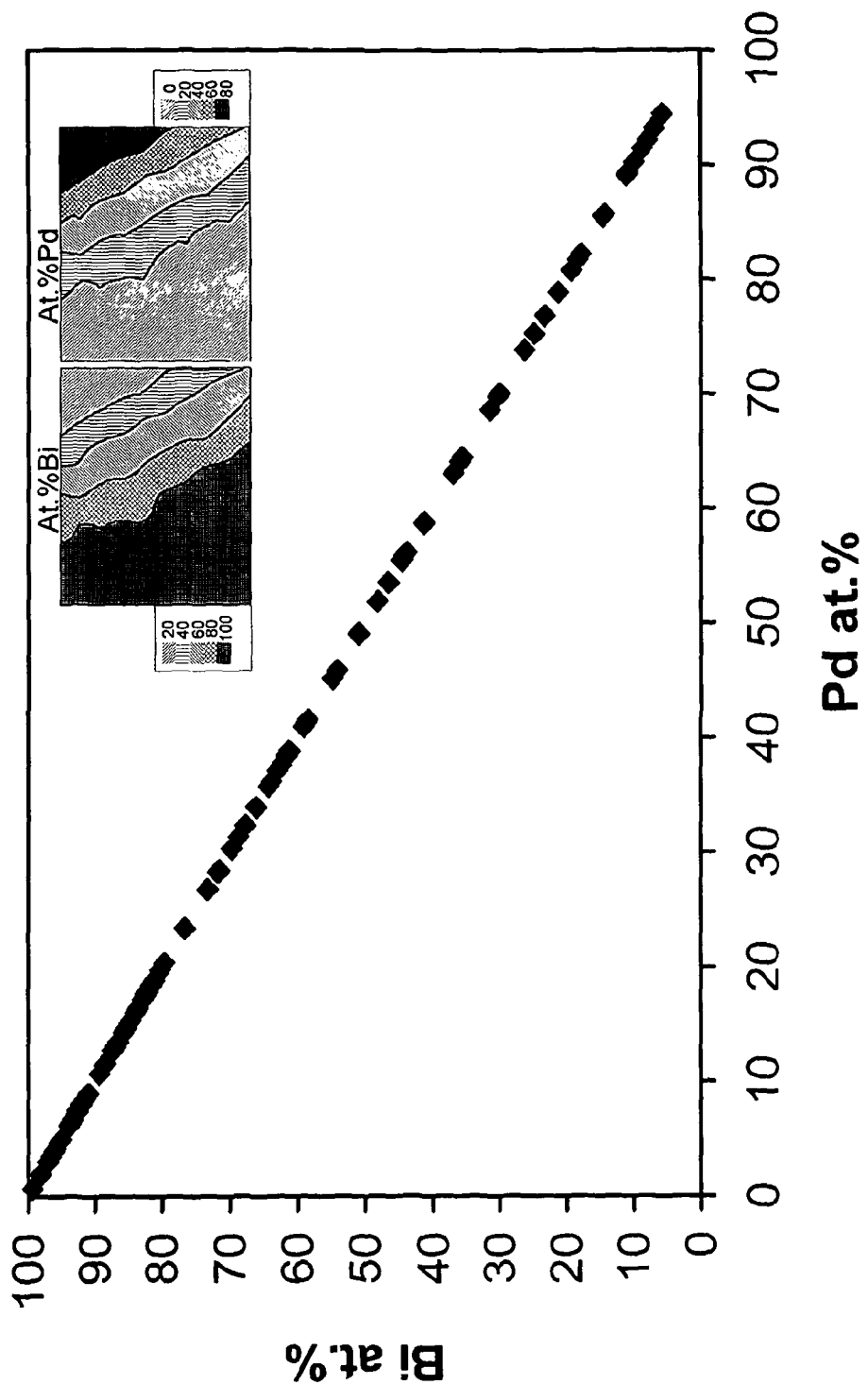
FIG. 1 illustrates the compositional range achieved on a single 100 element electrochemical array for the PdBi binary alloy, each point representing an electrode's composition.

The present invention relates in general terms to a catalyst, particularly though not exclusively for a hydrogen fuel cell, comprising a palladium/bismuth alloy of formula (I') as defined above.

In the formula (I'), x' is preferably 0.2 to 0.4, more preferably 0.3 to 0.35.

In the formula (I'), y' is preferably 0.6 to 0.8, more preferably 0.65 to 0.7.

In the formula (I'), x' is preferably 0.2 to 0.4 and y' is 0.6 to 0.8. More preferably, x' is 0.3 to 0.35 and y' is 0.65 to 0.7.

In the formula (I'), preferably M is a metal selected from Groups 7 to 11 of the Periodic Table, or a combination of any thereof. More preferably, M is a metal selected from Re, Ru, Os, Rh, Ir, Ni, Pt, Ag and Au or a combination of any thereof. Even more preferably, M is Ni or Pt or a combination of any thereof.

In the formula (I'), preferably z' is not greater than 0.05. More preferably, z' is not greater than 0.01. Even more preferably, z' is not greater than 0.005. Still more preferably, z' is not greater than 0.001. Most preferably, z' is 0, i.e. the alloy is a binary alloy of Pd and Bi.

In a particularly preferred embodiment, the alloy comprises the α-phase of $Bi_2Pd$. This alloy is described in the art, for example in H. Okamoto, *Journal of Phase Equilibria*, 1994, 15(2), 191-194.

The catalyst is typically supported on a support means not including Bi or Pd. The support means may be comprised of any material suitable for providing support for an alloy catalyst, provided it does not include Bi or Pd (either as the element or any compound thereof).

Examples of materials suitable as catalyst support means include carbon in any suitable form, for example carbon black, graphite, graphitised carbon or carbon nanotubes. Carbon supported catalysts are normally used for fuel cells because the surface area of catalysts is greatly increased by using carbon support and carbon has sufficient electronic conductivity and chemical stability under fuel cell operating conditions. The preparation of dispersed alloy on carbon supports may be achieved in a number of ways. For instance, the alloy catalysts may be formed by reduction of a mixture of compounds of component metals, or heat treatment of carbon supported Pd wherein the other metal salts are precipitated or adsorbed onto the surface. Alternatively, the alloy particles may be formed on the carbon supports by physical deposition, such as sputtering, physical evaporation and chemical vapour deposition.

Alternative catalyst support means include metal oxides, particularly conducting metal oxides such as titanium oxide (optionally doped with another transition metal, especially niobium), ruthenium oxide, iridium oxide, cadmium oxide, cadmium tin oxide, indium oxide, indium tin oxide, lanthanum-strontium-copper oxide (LSCO) and yttrium-barium-copper oxide (YBCO).

In preferred embodiments, the alloy and/or the catalyst support means are substantially free of sulphur and/or chlorine. Sulphur and chlorine are known to poison alloy catalysts of this type and their presence either in the alloy or the support should be minimised.

Methods

The alloys of the present invention may be prepared by a number of methods, particularly thin-film deposition methods, generally known to those skilled in the art. Examples of suitable thin-film deposition methods include physical deposition methods such as physical vapour deposition, sputtering, pulsed laser deposition and cathodic arc deposition, and chemical deposition methods such as plating, chemical vapour deposition and chemical solution deposition.

In one embodiment, a method of preparing the alloys of the present invention comprises vaporising Pd, Bi and, if required, one or more further metals M from one or more sources and depositing the vaporised Pd, Bi and, if required, one or more further metals M on a suitable substrate. In this embodiment, the vapour deposition is preferably carried out at a base pressure in the range of from $1\times10^{-6}$ Pa to $1\times10^{-6}$ Pa. More preferably, the vapour deposition is carried out at a base pressure in the range of from $1\times10^{-9}$ Pa to $5\times10^{-8}$ Pa.

In one embodiment, the alloys containing palladium, bismuth and, if required, one or more metals M can be prepared using the physical vapour deposition method described in Guerin et al, *J. Comb. Chem.* 2006, 8, 66-73.

In another embodiment, the alloys of the present invention may be prepared by sputter deposition. This method comprises depositing thin films of atoms by ejecting Pd, Bi and, if required, one or more further metals M from one or more sources and depositing the ejected Pd, Bi and, if required, one or more further metals M onto a suitable substrate, such as a silicon wafer. The atoms are ejected from a solid target material by bombardment of the target by energetic particles. The primary particles for the sputtering process can be supplied in a number of ways, for example by a plasma, an ion source, an accelerator or by a radioactive material emitting alpha particles.

Fuel Cell

The present invention also relates to a hydrogen fuel cell comprising: an anode; a cathode; an electrolyte; means for supplying a hydrogen-containing fuel to the fuel cell (typically the anode); and means for supplying an oxidant to the fuel cell (typically the cathode); wherein the anode and, optionally, the cathode includes a catalyst comprising an alloy of the formula (I), defined above.

In the formula (I), preferably x is 0.2 to 0.45. More preferably, x is 0.2 to 0.4. Even more preferably, x is 0.3 to 0.35.

In the formula (I), preferably y is 0.55 to 0.8. More preferably, y is 0.6 to 0.8. Even more preferably, y is 0.65 to 0.7.

In the formula (I), preferably x is 0.2 to 0.45 and y is 0.55 to 0.8. More preferably, x is 0.2 to 0.4 and y is 0.6 to 0.8. Even more preferably, x is 0.3 to 0.35 and y is 0.65 to 0.7.

In the formula (I), preferably M is a metal selected from Groups 7 to 11 of the Periodic Table, or a combination of any thereof. More preferably, M is a metal selected from Re, Ru, Os, Rh, Ir, Ni, Pt, Ag and Au or a combination of any thereof. Even more preferably, M is Ni or Pt or a combination of any thereof.

In the formula (I), preferably z is not greater than 0.05. More preferably, z is not greater than 0.01. Even more preferably, z is not greater than 0.005. Still more preferably, z is not greater than 0.001. Most preferably, z is 0, i.e. the alloy is a binary alloy of Pd and Bi.

In a particularly preferred embodiment, the alloy comprises the α-phase of $Bi_2Pd$.

In one embodiment, the alloy catalyst of the present invention is present only on the anode. The cathode may employ catalysts typically used on the cathodes of hydrogen fuel cells. Examples of suitable catalysts include platinum or platinum alloys. Typically, such catalysts are supported on support means such as those described and exemplified above.

In one embodiment, the electrolyte comprises a proton-conducting membrane (also known as a proton exchange membrane). Typically, the proton-conducting membrane comprises a proton-conducting organic polymer, in particular an organic polymer substituted with acidic groups such as carboxylic acid (—$CO_2H$) or sulfonic acid (—$SO_3H$) groups. Examples of suitable polymers typically used to form the proton-conducting membrane include fluorinated hydrocarbon polymers substituted with acidic groups such as carboxylic acid or sulfonic acid groups. A particularly preferred fluorinated hydrocarbon polymer is the sulfonated tetrafluoroethylene based fluoropolymer sold commercially as Nafion® by DuPont. This polymer comprises a tetrafluoroethylene backbone substituted with perfluorovinyl ether groups terminated with sulfonate groups. Other suitable proton-conducting membranes are produced with perfluorinated monomers such as octafluorocyclobutane and perfluorobenzene.

When the fuel cell includes a proton-conducting membrane, the alloy catalysts of the present invention may be deposited directly on the surface of the proton-conducting membrane for contact with a current collector. Alternatively the alloy catalysts may be deposited on the surface of an anode support, or within the pores of a porous anode support, such as a carbon structure that is placed in contact with the membrane.

In a further aspect, the present invention provides a membrane-electrode assembly for a fuel cell comprising a proton-conducting membrane, an anode and a cathode, in which the anode includes an alloy catalyst of formula (I) as defined above, either in its broadest aspect or a preferred aspect. The invention also provides a fuel cell comprising at least one membrane-electrode assembly of a proton-conducting membrane, a cathode and an anode which includes an alloy catalyst of formula (I) as defined above, either in its broadest aspect or a preferred aspect. The membrane electrode assemblies (MEA) may be assembled in series as MEA stacks to form fuel cells.

The fuel cells include means for supplying an oxidant (typically oxygen or an oxygen-containing gas such as air) to the cathode catalyst for reduction of oxygen to water and means for supplying a hydrogen-containing fuel (typically hydrogen gas or a hydrogen-containing gas) to the anode catalyst for generation of protons. Typically air is supplied to the cathode and pure hydrogen to the anode. Gas supply channels may be formed within porous cathode and anode support structures, or gas flow field plates may be placed in contact with the cathode(s) and anode(s).

The detailed construction of PEM fuel cells is well known to those skilled in the art. Typically the fuel cell comprises an anode, a cathode, a proton exchange membrane between the anode and the cathode, and catalysts for the catalytic oxidation of a hydrogen-containing fuel and for the reduction of oxygen. Electricity is generated by hydrogen oxidation by introducing the hydrogen-containing fuel into a fuel chamber open to the anode, while oxygen, preferably as air, is introduced into an air chamber open to the cathode. The hydrogen is oxidised at the anode to produce hydrogen ions and electrons. An electric current is withdrawn from the fuel cell into an outer circuit by current collectors in contact with the electrodes. Hydrogen ions migrate through the acidic proton exchange membrane and react with oxygen and electrons from the outer circuit at the cathode to form water.

Reactions

The alloy catalysts of the present invention are particularly suitable for catalysing the hydrogen evolution reaction (HER). The HER is the reduction of a proton source, i.e. a Brønsted acid, at a cell cathode to generate molecular hydrogen according to the equation:

$$2H^+ + 2e^- \rightarrow H_2$$

Therefore, in further aspects the invention comprises a method of producing hydrogen gas, comprising reducing a proton source at the cathode of an electrochemical cell, the cathode comprising an electrode according to the present invention. In one embodiment, the proton source is water, the water being optionally ionised and/or acidified.

The alloy catalysts of the present invention are also particularly suitable for catalysing the hydrogen oxidation reaction (HOR). The HOR is the oxidation of molecular hydrogen at the anode of a cell to generate protons, the protons then combining with oxygen at the cathode to generate a water molecule.

Therefore, in further aspects the invention comprises a method of oxidising a hydrogen-containing gas, the method comprising contacting the hydrogen-containing gas with the anode of an electrochemical cell, the anode comprising an electrode according to the present invention. In preferred aspects, the electrochemical cell is a hydrogen fuel cell according to the present invention.

The alloy catalysts of the present invention are also useful in the electrolysis of water to generate molecular hydrogen and molecular oxygen. This method comprises causing electric current to flow through a cell wherein the anode and, optionally, the cathode of the cell comprising an electrode according to the present invention. Hydrogen is generated at the cathode and oxygen at the anode. Typically, the water is ionised and/or acidified in order to accelerate the electrolytic process.

Examples

A wide compositional range of PdBi thin films has been prepared using a modified High Throughput Physical Vapour Deposition (HT-PVD) method. Simultaneous co-deposition of both elements allows for complete mixing of the two constituents, without the need of post deposition annealing, resulting in non-equilibrium solid solutions of the alloy components—see Guerin, S.; Hayden, B. E.; Lee, C. E.; Mormiche, C.; Russell, A. E. *J. Phys. Chem. B* 2006, 110, (29), 14355-14362. Details of the method are described in Guerin, S.; Hayden, B. E. *J. Comb. Chem.* 2006, 8, (1), 66-73.

All depositions were performed under ultra-high vacuum (UHV) conditions in a cryo-pumped chamber, at base pressure $1.33 \times 10^{-8}$ Pa ($1 \times 10^{-10}$ Torr). Palladium (Umicore, 99.99%) was deposited from an electron beam source, while a Knudsen cell was employed for bismuth (Alfa Aesar, Puratronic 99.999%).

Two different substrates have been utilised for the deposition of the binary system. The first, 32 mm silicon squares (Nova Electronic Materials), were used for source calibration, ex situ elemental analysis by Electron Dispersive Spectroscopy (EDS) (JEOL JSM5910 and Oxford Instruments INCA 300), ex-situ structural analysis by X-ray Diffraction (XRD) (Bruker, C2) and in-situ X-ray Photoelectron Spectroscopy (XPS) characterisation (PSP Vacuum Technology Resolve Multi Channel Analyser and VG X-Ray Gun). The second substrates were custom made (Quedos) electronic chips (arrays) used for the high throughput electrochemical screening. Each of these arrays comprised of a 10×10 grid where 100 independently addressable working electrodes can be found. The design and fabrication of the arrays is described in Guerin, S.; Hayden, B. E.; Lee, C. E.; Mormiche, C.; Russell, A. E. *J. Phys. Chem. B* 2006, 110, (29), 14355-14362.

Electrochemical experiments were performed in a three compartment glass cell, designed to accommodate the electrochemical array. A Pt mesh (Alfa Aesar, 99.99%) was used as counter electrode, separated from the working electrodes by a glass sinter. A commercial Mercury/Mercuric Sulphate electrode (MSE, 0.5 M $H_2SO_4$, Sentec) was employed as a reference electrode, mounted inside a Luggin capillary the tip of which was placed a few millimeters away from the array. All potentials reported here though are referenced against the Reversible Hydrogen Electrode (RHE). All working electrodes shared a common perchloric acid electrolyte (0.5 M), prepared by concentrated $HClO_4$ (double distilled, GFS Chemicals) and ultra-pure water (18.2 MΩ cm, ELGA). Details regarding the data collection and electrochemical cell design can be found in Guerin, S.; Hayden, B. E.; Lee, C. E.; Mormiche, C.; Owen, J. R.; Russell, A. E.; Theobald, B.; Thompsett, D. *J. Comb. Chem.* 2004, 6, (1), 149-158.

Experimental Protocol:

Prior to any experiments, the electrolyte solution was deaerated for 20 with argon (Air Products, N5 grade) to remove dissolved oxygen. Initially, cyclic voltamogramms were recorded in a narrow potential region near 0 $V_{RHE}$ defined by cathodic limit at $-0.05\ V_{RHE}$, anodic at 0.51 $V_{RHE}$ and initial (idle) potential at 0.2 $V_{RHE}$. Maximum 5 cyclic voltamogramms were recorded (scan rate 50 mV s$^{-1}$) while those presented here were collected from the third cycle. The electrocatalytic properties of the PdBi binary system towards HER and HOR were assessed by performing potential step experiments. In the case of hydrogen evolution, the potential was stepped from $-0.002\ V_{RHE}$ to $-0.023\ V_{RHE}$ by 0.007 V steps (85.5 s in length). During the HOR experiments, $H_2$ (BOC 99.995%) was allowed to flow through the electrolyte solution. The potential was from $-0.002\ V_{RHE}$ to $0.019\ V_{RHE}$ by 0.007 V steps (85.5 s in length). Before applying any potential the electrolyte solution was purged with $H_2$ (5 min, BOC 99.995%). All experiments were performed at 298 K.

Results

Thin non-equilibrated alloy films of the PdBi binary system have been deposited over a wide compositional range using the HT-PVD method. The range of compositions deposited on 100 electrodes of a single array are shown in FIG. 1, with the density of points on the line representing the number of samples produced over the range of compositions. The maximum variation of composition within a 1 mm$^2$ electrode for such a broad composition range is 3 atomic %. The inset shows the way the compositional gradients for each element are controlled in order to achieve the distributions of composition across the array. The thickness of the thin film alloys were ca. 70 nm across the entire compositional range.

Figure 2A:
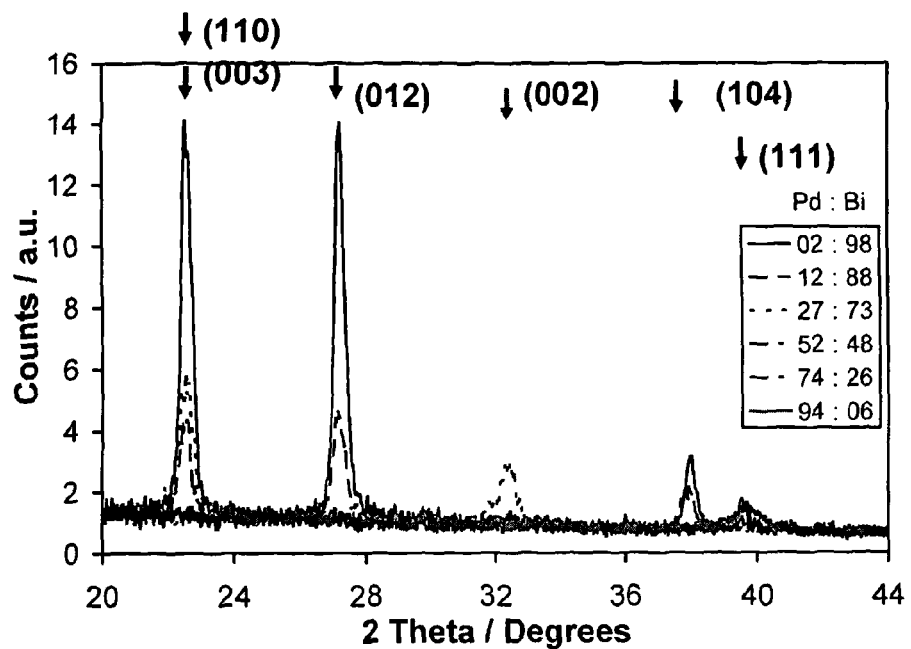
FIG. 2A shows XRD diffractograms of a number of the PdBi alloy thin films, indicating Bragg peaks associated with the Pd, Bi and the αBi$_2$Pd phase.
Figure 2B:
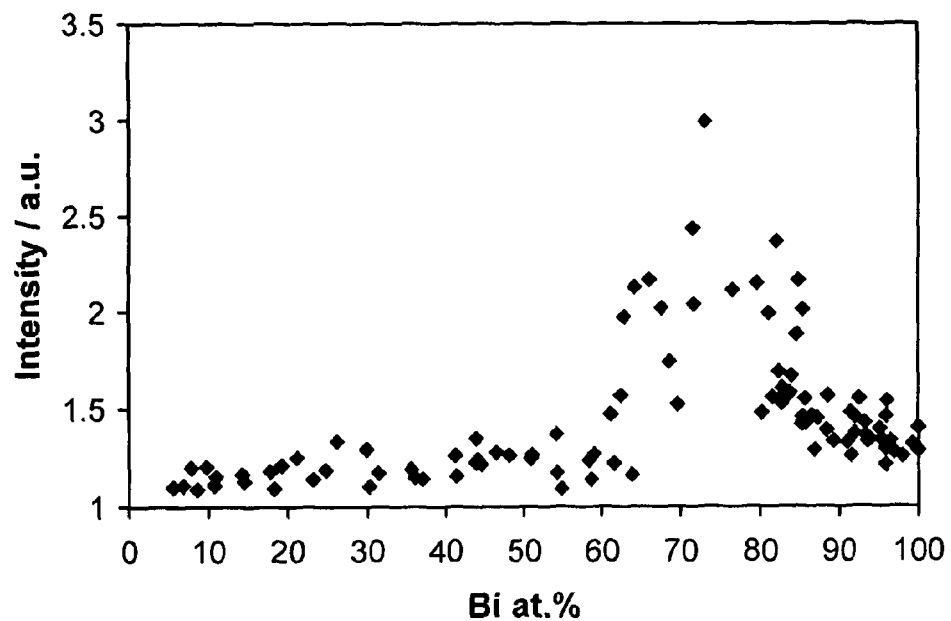
FIG. 2B plots the intensity of the peaks as a function of Bi atomic %.

FIG. 2A shows XRD diffractograms for a selection of compositions of the thin PdBi alloys, and the structures to which the Bragg peaks correspond are indicated. Diffractograms corresponding to Bi rich alloys were dominated by three main peaks at 2Θ values of 22.5, 27.2 and 38 degrees attributed to Bi (R$\bar{3}$m symmetry) (003), (012) and (104) index respectively—see Duan, X. K.; Yang, J. Y.; Zhu, W.; Fan, X. A.; Xiao, C. *J. Mater. Lett.* 2007, 61, (22), 4341-4343. Alloys rich in Pd are dominated by a weak diffraction peak at 2Θ=40° degrees, attributed to the (111) index of Pd (Fm$\bar{3}$m symmetry)—see Chu, S. Z.; Kawamura, H.; Mori, M. *Electrochim. Acta* 2007, 53, (1), 92-99. At alloy compositions between 0-50 At. % Bi, no additional phases of PdBi are observed. However, at ca. 73 At. % Bi, the diffraction is dominated by two Bragg peaks at 2Θ values of 22.5 and 32.3 which can be attributed to the αBi$_2$Pd alloy monoclinic phase of C2/m symmetry (see "*International Centre for Diffraction Data*" *PdBi$_2$ Card*), the (110) and (002) index respectively. In order to indicate the compositional region in which this phase was prevalent, the intensity of the αBi$_2$Pd (002) peak at 2Θ=32.3° is plotted as a function of composition (FIG. 2B), and its existence is consistent with the equilibrium phase diagram of the PdBi alloy system described in *ASM HANDBOOK Alloy Phase Diagrams Volume* 3 ASM International: 1992.

Figure 3A:
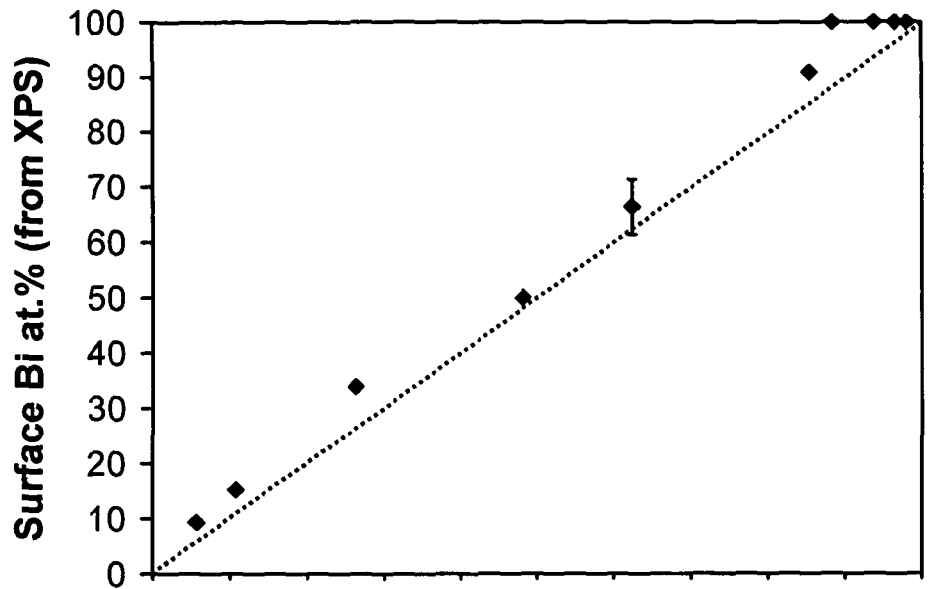
FIG. 3A plots the Surface composition of a number of the PdBi alloys (by atomic %) calculated from X-ray photoelectron spectroscopy (XPS) as a function of the bulk composition from Electron Dispersive Spectroscopy (EDS)

The surface composition (over the top ca. 3 atomic layers) of the PdBi alloys for a number of representative compositions was assessed directly following synthesis by means of XPS. The surface composition of these alloys was calculated by analysing the area under Bi($4f^{7/2}$) and Pd($3d^{5/2}$) peaks and employing the sensitivity factors and method described in Briggs, D. and Seah, M. P., *Practical Surface Analysis*. John Wiley & Sons: 1983. A plot of the surface vs. the bulk composition (from EDS) is presented in FIG. 3A. The results show that within the limit of experimental error, and as one may expect, there is no evidence of segregation of either element in the un-annealed alloy surfaces.

Figure 3B:
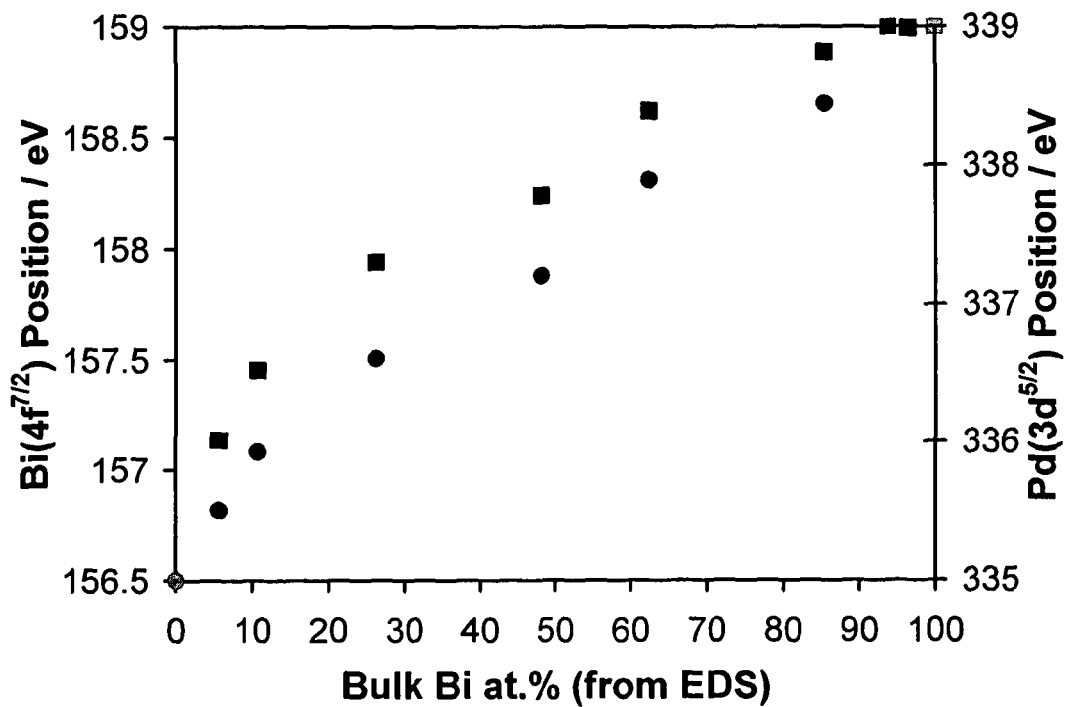
FIG. 3B plots the shift in the Binding Energy of the Bi($4f^{7/2}$) (squares) and Pd($3d^{5/2}$) (circles) XPS peaks position as a function of composition.

FIG. 3B shows the binding energies of the Bi($4f^{7/2}$) peak and Pd($3d^{5/2}$) peak as a function of composition. A downward shift in Bi($4f^{7/2}$), and a concomitant upward shift in Pd($3d^{5/2}$) is observed from the pure metal values (situated for Bi($4f^{7/2}$) at 159 eV: Briggs and Seah, described above, and for Pd($3d^{5/2}$) at 335 eV: Wagner, C. D.; Riggs, W. M.; Davis, L. E.; Moulder, J. F.; Muilenberg, G. E., *Handbook of X-ray Photoelectron Spectroscopy* Perkin-Elmer Corporation: 1979) on the formation of the alloy. This behaviour is consistent with charge transfer associated with significant electronic interaction between the alloy components, expected during the formation of solid solutions or alloy phases: see Egelhoff, W. F., Jr. *Surf. Sci. Rep.* 1986, 6, (6-8), 253-415.

Figure 4:
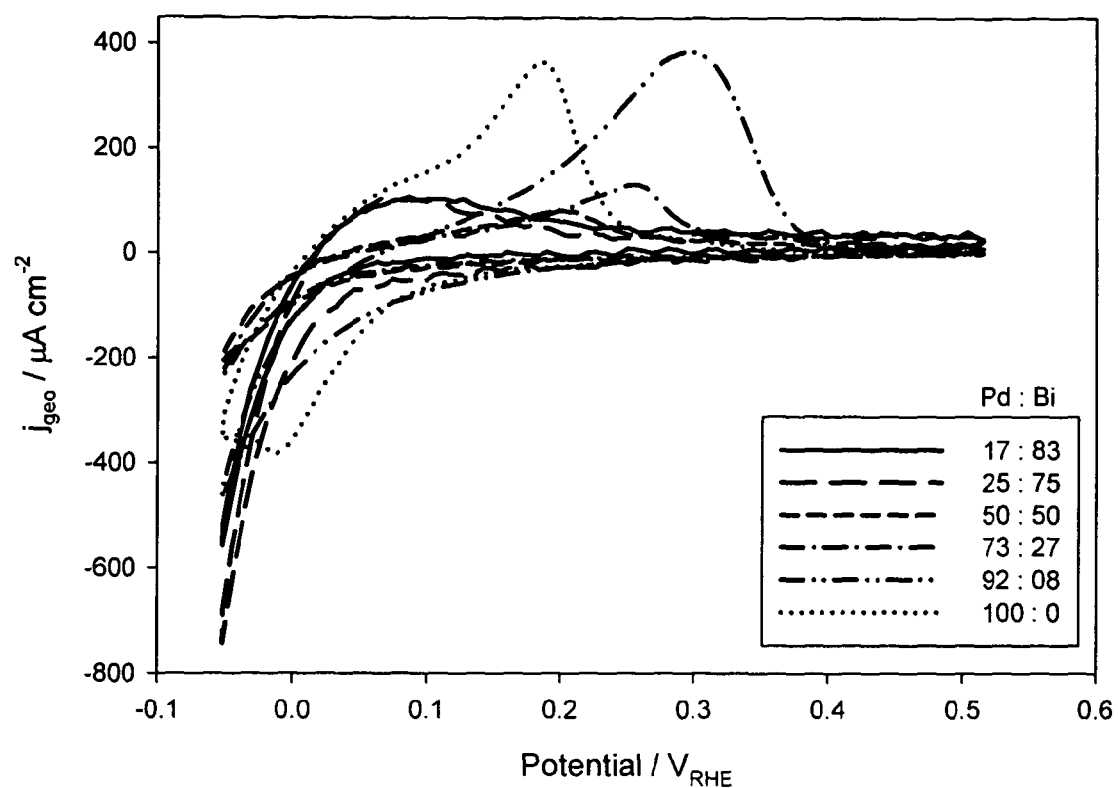
FIG. 4 shows cyclic voltammograms of the pure Pd electrode and a number of PdBi alloy surfaces in the potential region where hydrogen Under Potential Deposition (UPD), hydrogen absorption and hydrogen evolution will take place.

The electrochemical behaviour of the surfaces in the hydrogen UPD, absorption and HER region was assessed in cyclic voltammetry, carried out at 298 K in 0.5 M perchioric acid electrolyte, at 50 mV s$^{-1}$, in the potential range between $-0.05\ V_{RHE}$ and $0.55V_{RHE}$. The results for six different alloy compositions are shown in FIG. 4. Note that the currents of the pure Pd and 8 atomic % Bi alloy electrodes have been scaled down by a factor of 3.5. The pure Pd surface exhibited a cathodic peak near 0 $V_{RHE}$ associated with β-hydride formation with some HER current evident at the most negative potential, and an anodic peak close to 0.2 $V_{RHE}$ due to the oxidation of the β-hydride phase.

Incorporation of Bi in the Pd significantly alters the hydrogen absorption behaviour and the HER behaviour. The formation of the β-hydride phase is altered and eventually suppressed completely for compositions of 50 and 25 At. % Bi. At 25 At. % Bi, the voltammetry appears dominated purely by HER and a concomitant oxidation of the evolving hydrogen in the anodic sweep just above $0V_{RHE}$: Further increases in Bi concentration result in a reduction of the HER currents. No significant HER is observed on pure Bi in this potential range.

In order to assess the HER and HOR activities of the surfaces, the reactions were studied at steady state in potential step experiments at small overpotentials for the reaction. It can be deduced from FIG. 4 that under these conditions, bulk hydride formation for Pd, and alloys where the hydride phase could be formed, had taken place.

Figure 5A:
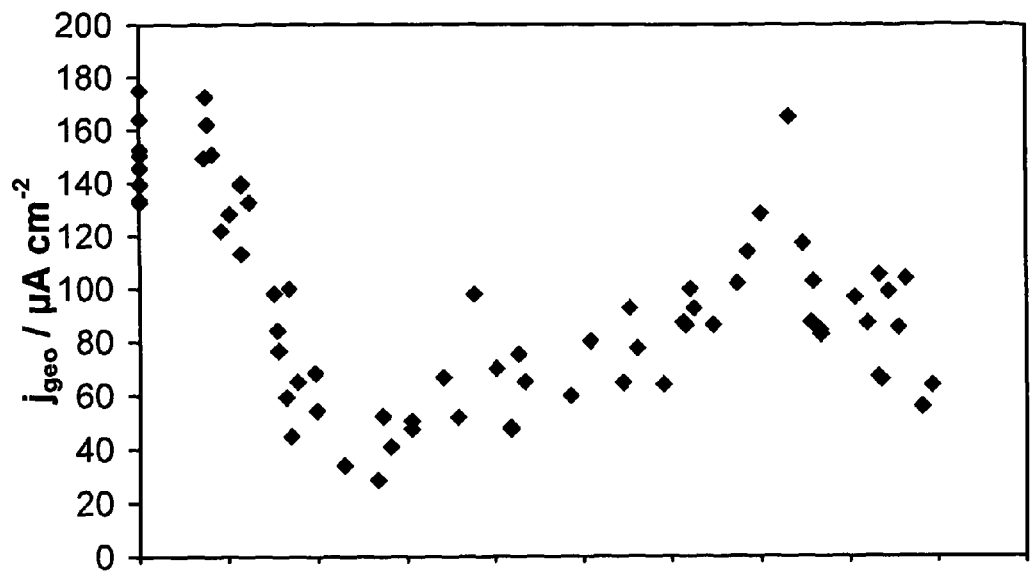
FIG. 5A plots the hydrogen evolution reaction (HER) geometric current density at $-0.016 V_{RHE}$ as a function of atomic % Bi.

The HER activity (geometric) of the PdBi films measured in potential step experiments is shown in FIG. 5A. HER currents are collected at $-0.016 V_{RHE}$, and are averaged over 22.5 s after holding the potential for 63 s. The results are shown for a single 100 electrode array and plotted as a function of alloy composition. The highest activity was observed for electrodes of pure Pd, and was constant for Pd rich surfaces with compositions of up to 10 atomic % Bi. Further increase in Bi content resulted in a decrease in activity, with a minimum observed at ca. 25 atomic % Bi.

Figure 5B:
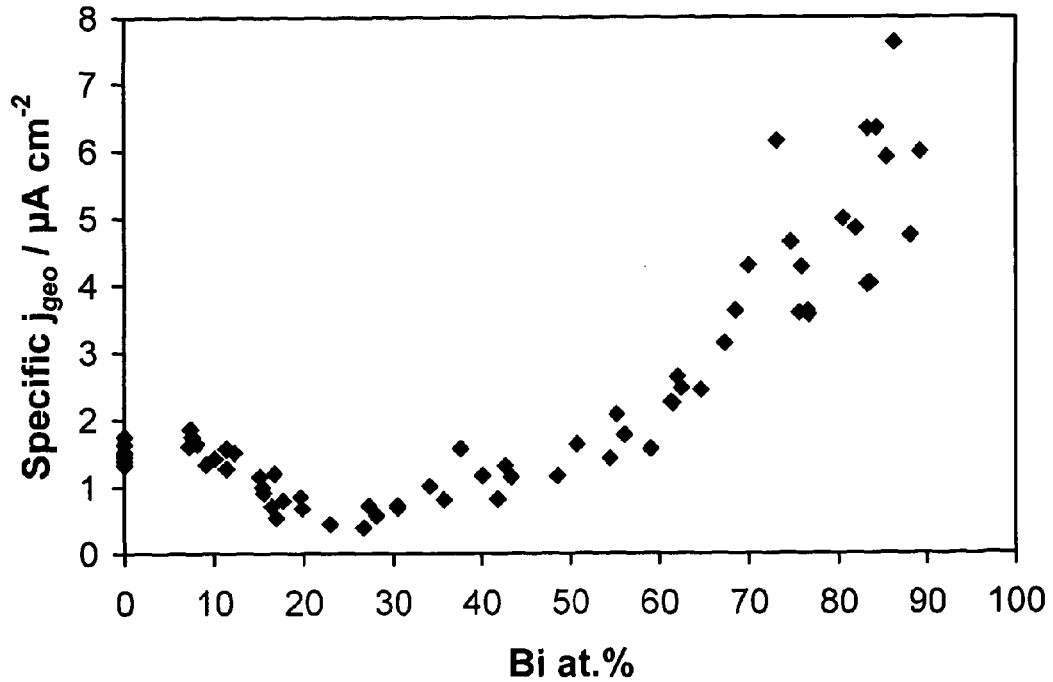
FIG. 5B plots the HER Pd specific current density as a function of atomic % Bi.

Above 30 atomic % Bi, a maximum in activity is observed at 70 atomic % Bi. This alloy composition, which shows a maximum activity, corresponds to the $\alpha Bi_2Pd$ bulk alloy phase identified in XRD (FIG. 2). The geometric HER activity of this phase is comparable to that of pure Pd. Since no segregation was evident for the un-equilibrated surfaces (FIG. 3), the Pd specific HER activity was obtained by dividing the current values of FIG. 5(A) by the atomic %. Pd: These values are plotted as a function of composition in FIG. 5(B). This result emphasises the increasing activity of the Pd when incorporated in an increasingly Bi rich matrix.

Figure 6A:
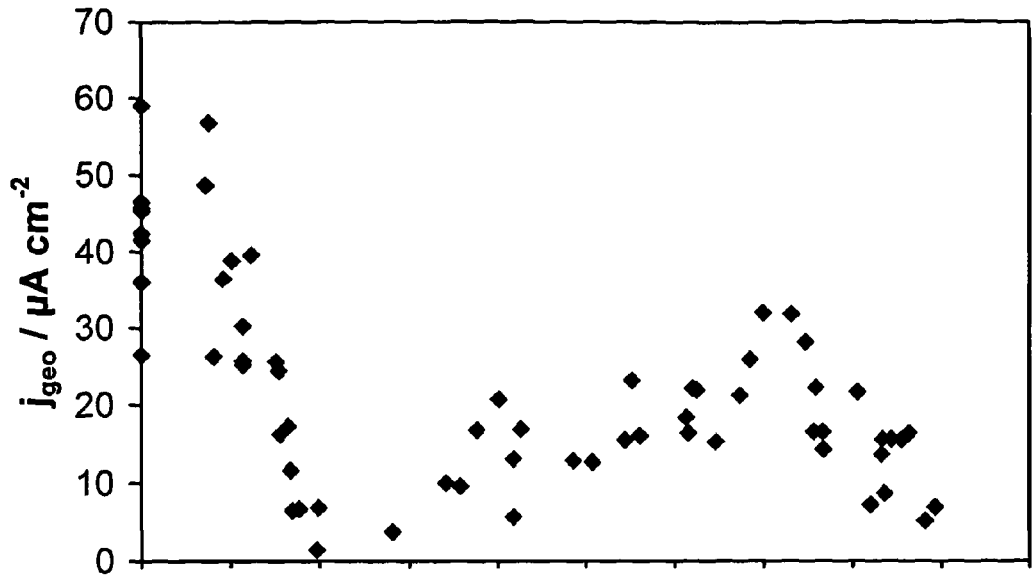
FIG. 6A plots the hydrogen oxidation reaction (HOR) geometric current density at $0.019 V_{RHE}$ as a function of atomic % Bi.
Figure 6B:
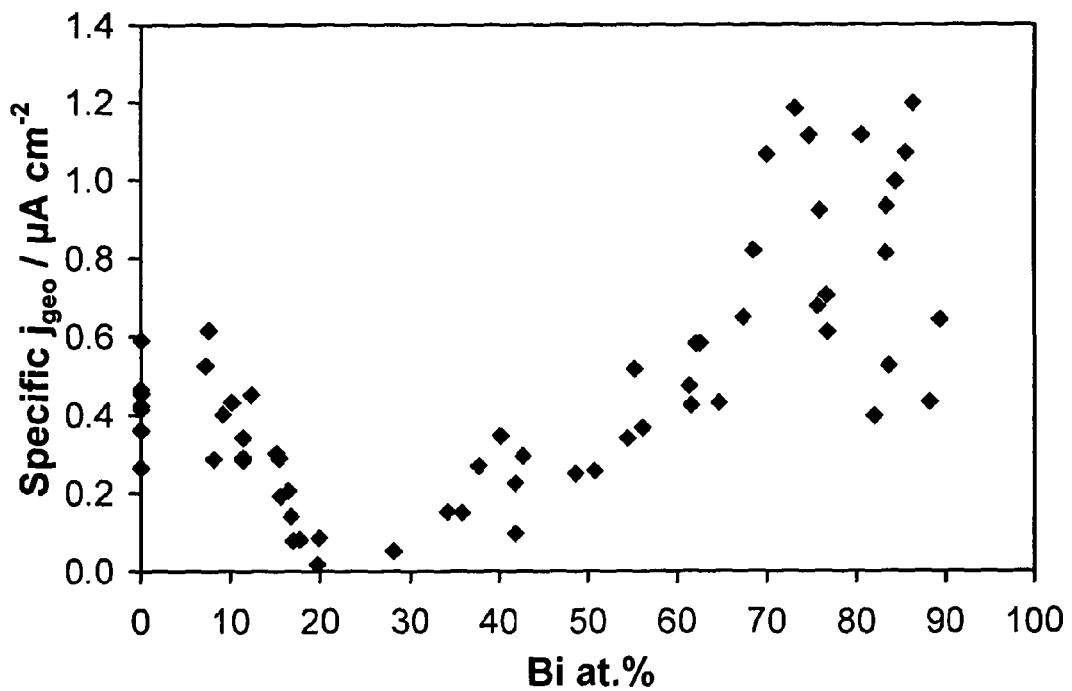
FIG. 6B plots the HOR Pd specific current density as a function of atomic % Bi.

The HOR activity (geometric) of the PdBi films measured in potential step experiments is shown in FIG. 6A. HOR currents are collected at 0.019 $V_{RHE}$, and are averaged over 22.5 s after holding the potential for 63 s. The results are shown for a single 100 electrode array and plotted as a function of alloy composition. As in the case of HER, the highest activity was observed for electrodes of pure Pd, and was constant for Pd rich surfaces with compositions of up to 10 atomic % Bi. Further increase in Bi content resulted in a decrease in HOR activity, with a minimum observed at ca. 25 atomic % Bi. Above 30 atomic % Bi, a maximum in HOR activity is observed at 70 atomic % Bi. It is this alloy composition which exhibited the greatest activity for HER, and corresponds to the $\alpha Bi_2Pd$ bulk alloy phase identified in XRD (FIG. 2). The geometric HOR activity of this phase is slightly smaller than that of pure Pd. Since no segregation was evident for the un-equilibrated surfaces (FIG. 3), the Pd specific HOR activity was obtained by dividing the current values of FIG. 6(A) by the atomic %. Pd: These values are plotted as a function of composition in FIG. 6(B). This result again (like those for HER) emphasises the increasing activity of the Pd for HOR when incorporated in an increasingly Bi rich matrix.

The results presented above indicate that PdBi alloys (in particular, a narrow compositional region of a PdBi alloy rich in Bi, the $\alpha Bi_2Pd$ bulk alloy phase) exhibit HER and HOR activities comparable to pure Pd. It is likely that activity in the alloy results from an enhanced activity of the Pd component in the surface. The core level shift in the $Pd(3d^{5/2})$ level clearly indicates a strong inter-metallic interaction in the alloy (FIG. 3), and this is likely to also result in a considerable change in the d-band density of states in the region of the Fermi level.

The concentration of Bi in the active inter-metallic PdBi alloy observed here corresponds to a higher concentration of Bi than that considered theoretically in Greeley et al. and is a bulk rather than a surface alloy. Through application of the Sabatier principle, one may expect that a lowering of the centre of the d-band in Pd may result in a higher activity for HER or HOR through a lowering of the hydrogen adsorption energy. It is therefore surprising that UPS studies of Bi rich (90 and 80 at. %) liquid PdBi alloys have revealed that the 4 d density of states at the Fermi level of Pd are shifted downwards in Bi alloys.

It is also interesting to note that the compositional dependence of the HER and HOR activity of the PdBi alloy system are highly correlated. This is a reasonable expectation near the equilibrium potential, and where the overpotentials for the two reactions are low. In the absence of ab initio calculations on HOR, the predictions of HER may provide a reasonable descriptor for HOR alloy catalysts. This may not be the case for systems exhibiting higher over-potentials for the reactions.

The high throughput synthesis and screening of PdBi alloys according to the present invention has shown that a maximum in both HER and HOR activity is observed at ca. 70 atomic % Bi, and the geometric activity is similar to that of pure Pd. The active alloy corresponds to the $\alpha Bi_2Pd$ bulk inter-metallic phase, identified in XRD. The increased activity of the alloy can be understood in terms of the Pd d-band density of states, and a concomitant increase in the binding energy of hydrogen.

Because of the relatively high activity of Pd for these reactions, and the benefit of a low cost of the Bi, the system provides a potential alternative to platinum at the anode of a polymer electrolyte membrane fuel cell. It provides the advantage over pure Pd in that the $\alpha Bi_2Pd$ bulk alloy phase does not form a bulk hydride, and will remain structurally more stable under operating conditions. In addition both Bi and Pd are stable in the acid environment at potentials relevant to an operating fuel cell anode.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry, materials science or related fields are intended to be within the scope of the following claims.

The invention claimed is:
1. A hydrogen fuel cell comprising:
an anode;
a cathode;
an electrolyte; and
a source of molecular hydrogen as fuel for the fuel cell; and
a source of oxygen as oxidant for the fuel cell;
wherein the anode includes a catalyst comprising an alloy of the formula (I):

$$Pd_xBi_yM_z \quad (I)$$

wherein:

M is a metal selected from Groups 7 to 11 of the Periodic Table or a combination of any thereof;

x is 0.2 to 0.4;

y is 0.6 to 0.8;

z is not greater than 0.1; and x+y+z=1.

2. A hydrogen fuel cell according to claim 1, wherein x is 0.3 to 0.35 and y is 0.65 to 0.7.

3. A hydrogen fuel cell according to claim 1, wherein M is a metal selected from Re, Ru, Os, Rh, Ir, Ni, Pt, Ag and Au or a combination of any thereof.

4. A hydrogen fuel cell according to claim 3, wherein M is Ni or Pt or a combination of any thereof.

5. A hydrogen fuel cell according to claim 1, wherein z is not greater than 0.05.

6. A hydrogen fuel cell according to claim 5, wherein z is not greater than 0.01.

7. A hydrogen fuel cell according to claim 6, wherein z is 0.

8. A hydrogen fuel cell according to claim 1, wherein the alloy comprises the α-phase of $Bi_2Pd$.

9. A hydrogen fuel cell according to claim 1, wherein the catalyst is present only on the anode.

10. A hydrogen fuel cell according to claim 1, wherein the electrolyte comprises a proton-conducting membrane.

11. A hydrogen fuel cell according to claim 10, wherein the proton-conducting membrane comprises a proton-conducting organic polymer.

12. A membrane-electrode assembly for a hydrogen fuel cell comprising a proton-conducting membrane, an anode and a cathode, wherein the anode includes a catalyst comprising an alloy of the formula (I):

$$Pd_xBi_yM_z \tag{I}$$

wherein:

M is a metal selected from Groups 7 to 11 of the Periodic Table or a combination of any thereof;

x is 0.2 to 0.4;

y is 0.6 to 0.8;

z is not greater than 0.1; and x+y+z=1, and wherein the hydrogen fuel cell comprises a source of molecular hydrogen as fuel for the fuel cell.

13. A hydrogen fuel cell according to claim 1, wherein the cathode includes a catalyst comprising an alloy of the formula (I).

14. A membrane-electrode assembly for a hydrogen fuel cell according to claim 12, wherein the cathode includes a catalyst comprising an alloy of the formula (I).

* * * * *